R. COLVIN.
Bee Hive.
No. 33,826.
Patented Dec. 3, 1861
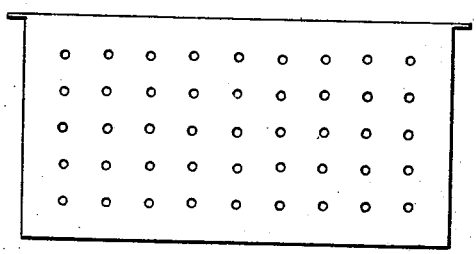
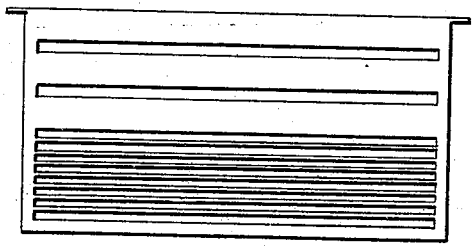
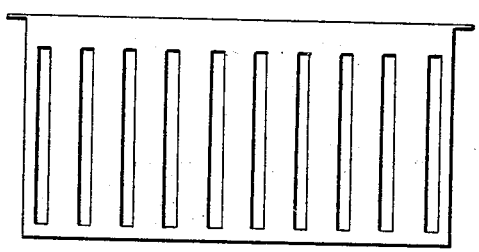
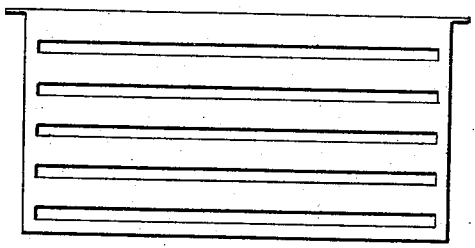
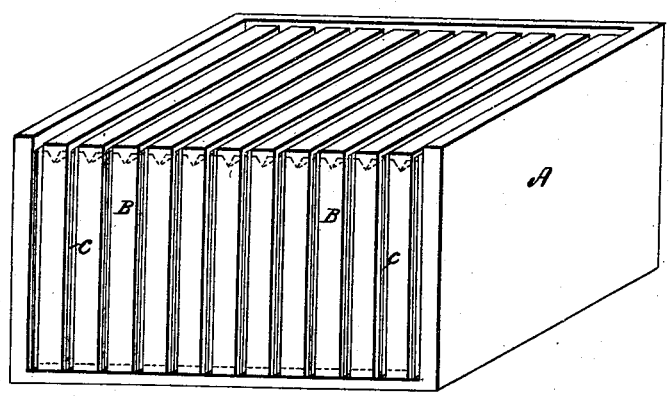
Witnesses:
William M. Henderson
Wm. S. Thompson
Inventor:
Richard Colvin

UNITED STATES PATENT OFFICE.

RICHARD COLVIN, OF BALTIMORE, MARYLAND.

IMPROVEMENT IN BEE-HIVES.

Specification forming part of Letters Patent No. 33,826, dated December 3, 1861.

*To all whom it may concern:*

Be it known that I, RICHARD COLVIN, of Baltimore city and State of Maryland, have invented a new and useful Improvement in Bee-Hives; and I do hereby declare that the following is a full, clear, and exact description of the construction and operation of the same, reference being had to the annexed drawings, making a part of this specification, in which—

Figure 1 is a perspective view of a Langstroth hive, showing the improvement. Figs. 2, 3, 4, and 5 are details of the improvement, as hereinafter more fully described.

The object of my invention is to secure straight combs generally in any kind of hive, although it is particularly and most conveniently applicable to hives in which movable frames or bars from a prominent feature; and it consists in making a division or partition between the spaces I desire to have occupied by combs.

In Fig. 1, A is the body of the hive, B B are the movable frames, and C C the partitions, of which Figs. 2, 3, 4, and 5 are modifications.

Straight combs have been obtained perfectly and approximately in various ways. Bees will follow, increase, and extend a comb in the direction of any fragmentary portions of comb which may be placed for their guidance. The use of small portions of combs, called "guide-combs," affixed to the tops of hives or within frames and upon bars, is well known and extensively practiced; nor is there any drawback to their use except that which exists in the care required in keeping a sufficient quantity of the fragile material on hand for the use of a large apiary and the trouble and time required to fix them within the hives in the directions in which it is desired to have the bees build the combs. Bees will build their combs upon salient angles which extend from the top of the hive into it or which form the under sides of bars at the top of the hive or the top bars of movable frames.

Although bees will generally build their combs upon salient angles and will make them to follow the direction of their length, yet they often make exceptions to this general rule and build across or between the angles, which in those hives where the comb is desired and intended to be movable is a source of much trouble, as portions of the comb must be crushed in the removal, together with the inmates. Another advantage arising from having straight combs is that the cells are more likely to be of a uniform depth, more fitting for brood-combs.

Bees are said by Minor, a writer on the subject of bee culture, to build their combs in the direction of a line of wax traced or left upon the top of the hive; but, while this may be the rule, the exceptions are so very numerous as to make it of no value.

In using the partitions they should be movable, and should extend from or near the top of the hive downward for a considerable distance. It will not answer to have them narrow, extending down into the hive but little, as they will then too nearly approximate to salient angles, and the bees will then be very apt to make the foundations of their combs upon instead of between them. The partitions should extend well across the hive, as well as downward into it. It is not necessary to have them fill or extend the full length and depth of the hive. Indeed, it is better they should not do so, for a free passage for the bees all around the partition will greatly facilitate their work, and holes or slots in or through the partitions will also improve them.

The material of which the partitions are made or their form or the way in which they are held in place with the hive are not the essence of my invention, and all these things may be greatly varied without departing from its spirit. Tin plates, perforated or otherwise, or partitions composed of tin slats or of wire or tin slats and wires combined, make good dividers or partitions, on account of the little space which they occupy.

The partition, being detachable from the hive, may be removed from it as soon as the foundations of the combs are made and their direction determined; or they may be allowed to remain until the entire comb is built, which latter would probably secure more perfect regularity.

The invention may be more fully understood from a description of its application to the Langstroth movable comb-hive. Before hiving a new swarm therein remove one or two of the frames which is required to accommodate the partitions within the hive and between the frames or some of them, leaving as much space between the frames nearest the partitions and the partitions themselves as is required and found between combs generally. It is not absolutely necessary to place partitions between each pair of frames, though more perfect regularity would result from doing so, but it will be sufficient if one is placed between the second and third frames from the end or side of the hive, and another between the fourth and fifth frames, and so on. The bees will then commence and make the foundations of their combs upon the frames and parallel with the partitions. When the combs are well commenced or when they are completed, whichever may be preferred, the partitions may be removed, the frames closed to their proper distances apart, and those which were removed, as before stated, may be reinserted.

What I claim as my invention, and desire to secure by Letters Patent, is—

The divisions or partitions placed between the spaces designed to be occupied by combs in bee-hives for the purpose of insuring straight and uniform combs, substantially as herein described, when either the partitions or comb-frames, or both, are made capable of independent lateral movement.

RICHARD COLVIN.

Witnesses:
AND. C. GREGG,
PETER HARR.